Nov. 29, 1927.

C. S. KELLUM

VALVE

Filed May 16, 1925

1,650,797

Inventor:
Charles S. Kellum
By
Attorneys

Patented Nov. 29, 1927.

1,650,797

UNITED STATES PATENT OFFICE.

CHARLES S. KELLUM, OF DETROIT, MICHIGAN, ASSIGNOR TO COMMONWEALTH BRASS CORPORATION, OF DETROIT, MICHIGAN, A CORPORATION OF MICHIGAN.

VALVE.

Application filed May 16, 1925. Serial No. 30,693.

In certain types of valves, such for example as those wherein the spindle is enclosed in an expansible chamber, it often happens that there is a tendency for the valves to become unseated or become varied in their adjustment either as a result of the tension of the expansible chamber overcoming the resistance of the feed screw or as the result of other forces, such as pressure within the valve, effecting an undesired movement of the spindle in one or other direction; and this invention therefore has for its object to provide simple and readily applicable means for alleviating this condition without interfering with the general construction of the valve; a further object of the invention being to provide, on the reciprocal spindle of a valve, yieldable friction means adapted to neutralize any tendency to effect the undesired movement of the said spindle by forces within the valve or by vibration to which the valve may be subjected.

The invention still further aims to utilize spring pressed friction members as means for accomplishing the aforesaid objects and to provide a simple method of applying and housing such means to and on a valve.

Still further objects subsidiary to or resulting from the aforesaid objects, or from the construction or operation of the invention as it may be carried into effect, will become apparent as the said invention is hereinafter further disclosed.

In carrying the said invention into effect, I may provide, in a valve having a spindle adapted to combined rotary and reciprocal movement for the opening and closing of the said valve, members laterally engaging the said spindle and resiliently pressed thereagainst to deter the movement thereof, and means associated with that portion of the valve through which the spindle extends housing the said members in their operative relation to the spindle and protecting them from dislodgment or injury.

All of which is more particularly described and ascertained hereinafter, by way of example, having reference to the accompanying drawing, wherein—

Figure 1:
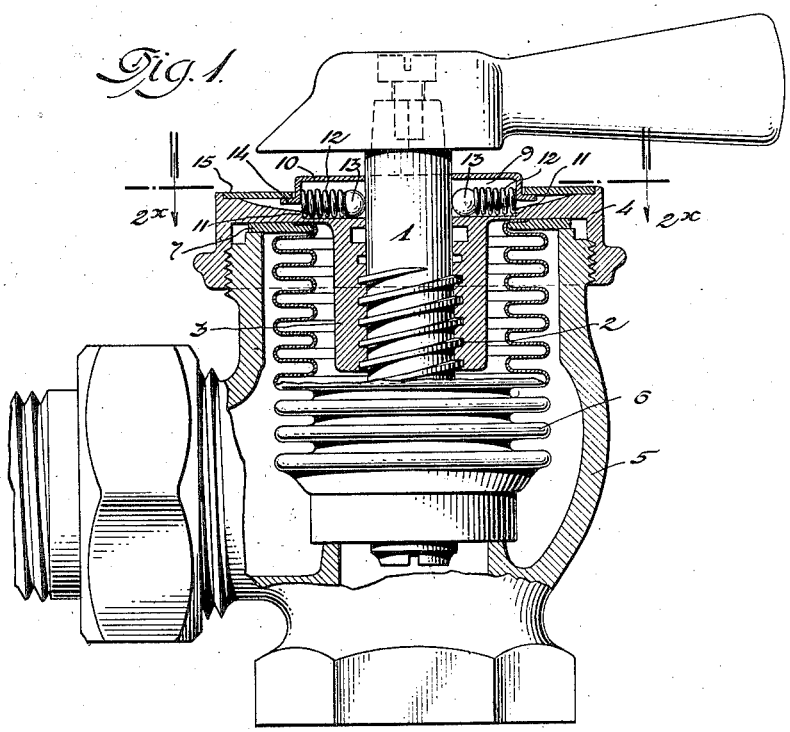
Figure 2:
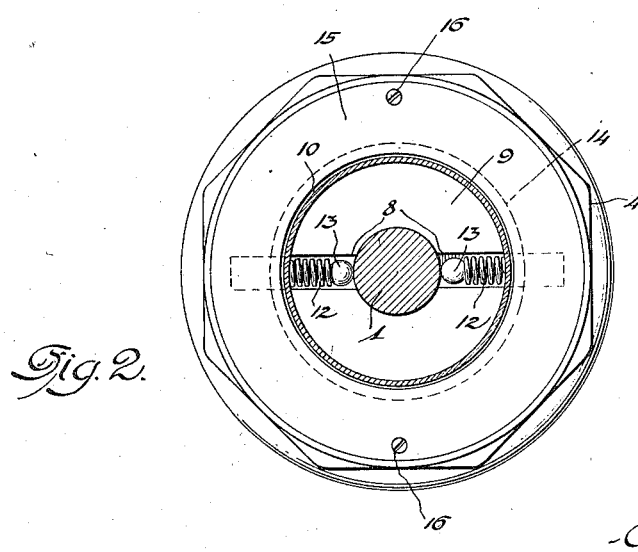

Figure 1 is an elevation partly broken away and in section of a valve embodying the said invention; and Figure 2 is a horizontal section taken on the line 2×—2×, Figure 1.

Similar characters of reference indicate similar parts in both figures of the drawing.

A well known type of valve is shown wherein the spindle 1 has its lower part provided with threads 2 engaging in a depending tubular threaded portion 3 of a closure 4 which is threaded onto and forms part of a valve casing 5, the said spindle within the casing being enclosed within an expansible metallic bellows device 6, the upper end of which is provided with a ring 7 clamped between the said closure 4 and the upper edge of the said valve casing 5 to provide a non-leakable assembly.

In such valves, it sometimes happens that due to pressures within the valve or to the tension or compression of the expansible device 6 there is a tendency of the spindle to move, especially when the valve is subjected to vibration, in one or other direction which is very undesirable, and to overcome this, I provide means intended to neutralize this effect and to deter the said spindle against such undesirable movement.

To this end, I have indicated the closure 4 as having radial slots or recesses 8 provided in its upper surface and extending through an upwardly projecting boss 9 which is adapted to receive a cap 10 forming a closure for the said slots, which slots are also preferably provided with shoulders 11 contiguous to the inner peripheral wall of the said cap, and in these slots resilient members in the form of springs 12 are mounted and press friction members in the form of balls 13 laterally against the said spindle. The slots only partially accommodate said spring members. These balls are preferably of steel and the spindle being usually of brass they are inclined to form grooves therein in the direction of movement of the said spindle, which increase their effectiveness in overcoming the objections hereinbefore referred to, but they do not interfere with the ordinary operation of the valve.

The cap 10 provides a housing means for the springs and friction members and engages the outer ends of said springs extending from said slots and is preferably annularly flanged at 14 so that it may be secured against removal by a suitably applied ring or plate 15 secured to the top of the closure 4 in any convenient manner, such for example as by screws 16.

Athough the device is quite simple, it is very effective in overcoming the objectionable features of a valve of this type referred to, and due to its simplicity may be readily applied thereto without material change or appreciable added expense, making the valve so equipped much more reliable in its operation than would otherwise be the case.

This invention may be developed within the scope of the following claims without departing from the essential features of the said invention, and it is desired that the specification and drawing be read as merely illustrative and not in a limiting sense, except as necessitated by the prior art.

What I claim is:—

1. In combination with a valve casing and a spindle movable therein, friction members engaging said spindle, springs yieldably effecting such engagement, said springs and friction members being partially accommodated in recesses in the casing extending radially from said spindle, and means housing said springs and friction members on said casing, said housing means engaging the outer ends of said springs extending from said recesses.

2. In combination with a valve casing and a spindle movable therein, friction members engaging said spindle, springs yieldably effecting such engagement, an annularly flanged cap covering and enclosing the springs and friction members, and a ring member affixed to said casing engaging the flange of said cap.

In testimony whereof I affix my signature.

CHARLES S. KELLUM.